(12) United States Patent
Auld

(10) Patent No.: US 7,275,873 B2
(45) Date of Patent: Oct. 2, 2007

(54) ADAPTER FOR COUPLING AN EXTERNAL POST CONNECTOR OR A BNC CONNECTOR TO AN SMA BUSHING

(75) Inventor: Michael D. Auld, Chesterfield, MO (US)

(73) Assignee: Synergetics, Inc., St. Charles, MO (US)

( * ) Notice: Subject to any disclaimer, the term of this patent is extended or adjusted under 35 U.S.C. 154(b) by 291 days.

(21) Appl. No.: 10/857,187

(22) Filed: May 28, 2004

(65) Prior Publication Data

US 2005/0265667 A1    Dec. 1, 2005

(51) Int. Cl.
*G02B 6/38* (2006.01)
*H01R 33/945* (2006.01)

(52) U.S. Cl. .............. 385/58; 385/53; 385/55; 385/75; 385/88; 385/92; 385/56; 439/577

(58) Field of Classification Search ........... 385/56, 385/53, 60, 55, 70, 138, 66, 81, 139, 92, 385/88, 58, 75; 439/577
See application file for complete search history.

(56) References Cited

U.S. PATENT DOCUMENTS

| | | | |
|---|---|---|---|
| 3,932,761 A | 1/1976 | Ramsey et al. | 385/53 X |
| 4,199,736 A | 4/1980 | McTaggart et al. | 333/172 |
| 4,553,814 A | 11/1985 | Bahl et al. | 385/53 X |
| 4,902,094 A | 2/1990 | Shank | 385/76 X |
| 5,074,637 A | 12/1991 | Rink | 385/56 |
| 5,085,492 A | 2/1992 | Kelsoe et al. | 385/60 |
| 5,452,391 A | 9/1995 | Chou et al. | 385/92 |
| 5,570,445 A | 10/1996 | Chou et al. | 385/92 |
| 5,785,645 A | 7/1998 | Scheller | 600/171 |
| 5,807,242 A | 9/1998 | Scheller et al. | 600/182 |
| 6,357,932 B1 | 3/2002 | Auld | 385/76 |
| 6,634,799 B2 | 10/2003 | Auld | 385/76 |
| 7,015,709 B2 * | 3/2006 | Capps et al. | 324/754 |
| 2005/0265667 A1 * | 12/2005 | Auld | 385/58 |

* cited by examiner

*Primary Examiner*—Brian M. Healy
(74) *Attorney, Agent, or Firm*—Thompson Coburn LLP

(57) ABSTRACT

An assembly used to adapt an external post connector, such as a BNC type connector of a microsurgical optic fiber instrument to a threaded SMA type bushing of a light source includes an adapter that can be threaded on the bushing of the light source and is also connectable to the BNC connector.

27 Claims, 4 Drawing Sheets

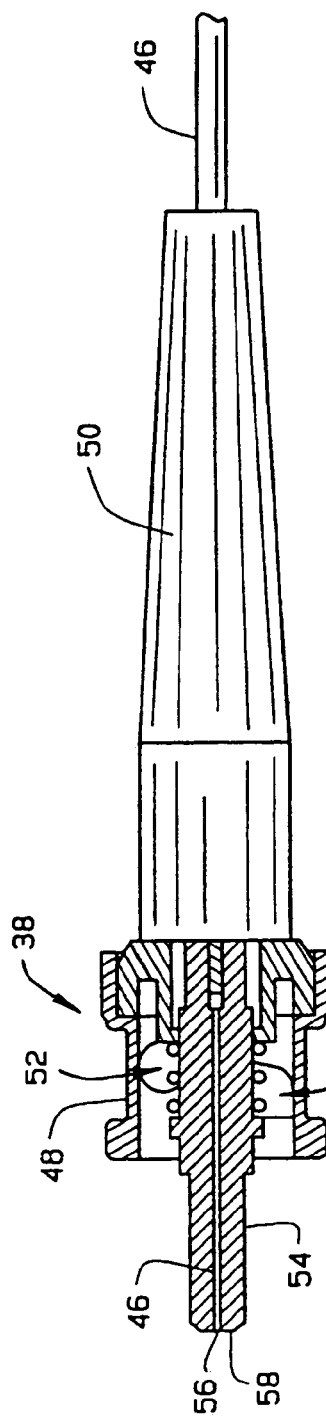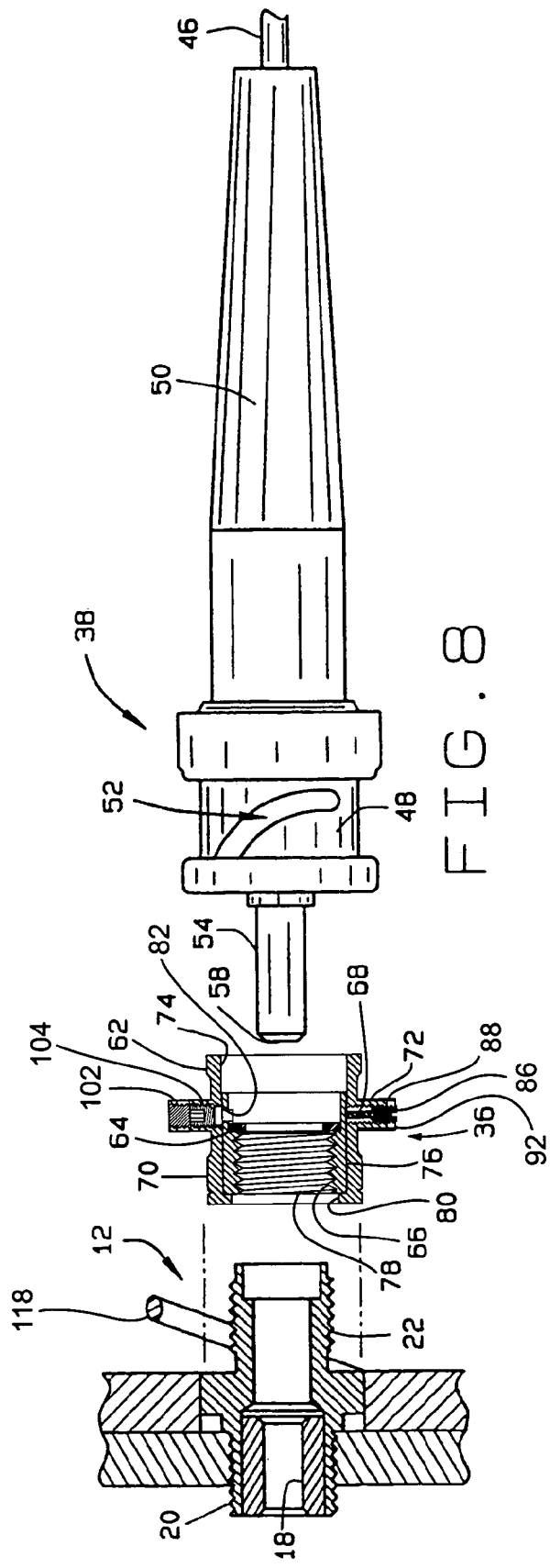

ADAPTER FOR COUPLING AN EXTERNAL POST CONNECTOR OR A BNC CONNECTOR TO AN SMA BUSHING

BACKGROUND OF THE INVENTION (1) Field of the Invention

The present invention pertains to an assembly that is used to adapt a BNC type connector of a microsurgical optic fiber instrument to a threaded SMA type bushing connector of a light source.

(2) Description of the Prior Art

In microsurgery such as ophthalmic surgery or surgery of the eye, various different types of instruments are available for use by the surgeon to deliver light to the interior of the eye. These instruments deliver light for illumination as well as laser light for use in surgery. A basic microsurgical instrument of this type is comprised of a handle with a projecting tubular probe or tip and a length of optic fiber entering the rearward end of the handle and passing through the handle and the tip to the tip distal end. The proximal end of the optic fiber opposite its connection to the handle is provided with a connector for connecting the fiber proximal end to a light source, either an illumination source or a laser light source. By positioning the proximal end of the optic fiber adjacent the light source, the light is transmitted through the fiber to its distal end and is emitted from the distal end. Where the light source is a source of laser light used in eye surgery, the positioning of the fiber proximal end relative to the laser light must be accurately controlled. Connectors employed for such a purpose are referred to as SMA type connectors.

FIGS. 1 and 2 show examples of prior art SMA connectors. FIG. 1 shows the construction of a male optic fiber connector 10 and FIG. 2 shows the construction of a female optic fiber connector 12 that receives the male connector of FIG. 1. These prior art connectors are widely used and will only be described generally. The male connector 10 has a center axis 14 that is aligned coaxially with a center axis 16 of the female connector 12 when the two connectors are joined.

The female connector or bushing 12 is provided with an alignment sleeve 18 in its interior. The sleeve 18 receives the male connector 10 and ensures a precise alignment of an optic fiber (not shown) extending through the male connector 10. A laser light source is positioned relative to the female connector 12 to direct a beam of laser light along the female connector center axis 16. The female connector has a first set of external screw threading 20 that is employed in securing the female connector 12 to a wall or bracket of the laser light source to securely hold the female connector relative to the light source. A second set of external screw threading 22 on the female connector is employed in attaching the male connector 10 to the female connector 12.

The male connector 10 includes a center ferrule 24. A cable nut 26 is mounted for rotation on the center ferrule 24. The cable nut 26 is secured on the ferrule 24 by a back post 28 that is screw threaded on the ferrule. The cable nut 26 has internal screw threading 30 that is complementary to the external screw threading 22 of the female connector. The optic fiber of the microsurgical instrument (not shown) passes through the back post 28 and the ferrule 24 with a distal end of the optic fiber being positioned adjacent the distal end of the ferrule 24.

In attaching the male connector 10 to the female connector 12, the ferrule 24 is first inserted through the interior bore of the female connector and into the alignment sleeve 18.

The cable nut 26 is turned causing its internal threading 30 to be screw threaded onto the external threading 22 of the female connector. This securely connects the male connector 10 with the female connector 12 with their respective axes 14, 16 aligned. In this way, the beam of laser light of the light source (not shown) is directed at the exposed end of the optic fiber contained in the male connector 10.

Use of the prior art connectors described above has been found to be inconvenient in that it is necessary to completely unscrew the cable nut 26 of the male connector 10 from the external screw threading 22 of the female connector 12 when removing one instrument from the light source, and then screw a cable nut 26 of another instrument onto the female connector external threading 22 when switching one microsurgical instrument for another. It would be more convenient if the male connector 10 could be quickly connected with and disconnected from the female connector 12 without requiring repeated rotations of a cable nut in connecting and disconnecting the two connectors.

The prior art also includes laser light sources having female connectors and sets of microsurgical instruments having male connectors that can only be used with each other. The prior art laser light source is specifically designed so that it will not operate if a male connector of a microsurgical instrument is connected to the light source, where the microsurgical instrument and male connector are not manufactured by the particular manufacturer of the light source. This is accomplished by encoding the male connector 10 of the surgical instrument with an electronic device that is recognized by the light source when the male connector is attached to the female connector of the light source. An example of such a male connector and female connector is disclosed in the U.S. Pat. No. 5,085,492 of Kelsoe et al. This has been found to be inconvenient when it is desirable to use other types of microsurgical instruments with the particular laser light source.

The above-described inconvenience could be overcome by an adapter that can be attached to the female connector of a laser light source of the type that operates only with associated electronically encoded surgical instruments where the adapter contains the electrical device recognized by the light source and also enables a quick connect and disconnect of the surgical instrument to the adapter.

SUMMARY OF THE INVENTION

The present invention overcomes the inconveniences of prior art SMA type connectors described above by providing an adapter that enables a connector with at least one external post, for example a BNC type connector, to be attached to the external screw threading of a female connector or bushing of the SMA type. In addition, the adapter also is electronically encoded and therefore enables use of any type of surgical instrument having an external post type connector with a laser light source of the type that only recognizes electronically encoded surgical instruments.

The adapter of the invention is part of an assembly that includes a microsurgical optic fiber instrument having an external post, or BNC type connector in lieu of a SMA type connector usually found on these types of surgical instruments. Like the SMA connector, the external post connector also has a center ferrule that projects from the connector and through which the optic fiber extends. However, instead of having the cable nut found on SMA connectors, the external post connector of the invention has a conventional BNC type connector including a cylindrical collar with a pair of spiraling slots formed in the collar.

The adapter includes a cylindrical adapter sleeve constructed of an insulating material, for example a plastic. The sleeve has an external surface with a pair of posts projecting from the surface on diametrically opposite sides of the sleeve. The posts are positioned to be engaged by the slots of the BNC connector and enable the BNC connector to be attached to the exterior surface of the sleeve by merely turning the BNC connector one-quarter turn relative to the sleeve. The sleeve also has a cylindrical interior surface. At least one of the sleeve posts has an internally threaded bore extending entirely through the post from the exterior of the sleeve to the interior of the sleeve.

A conductive cylindrical insert is provided in the interior bore of the sleeve. The insert has internal screw threading that is complementary to that of the female bushing of the laser light source. The internal screw threading does not extend through the entire length of the insert, but is only positioned adjacent the end of the insert to be attached to the externally threaded female bushing of the laser light source. An annular conductive stop is also secured in the interior of the insert. The stop is positioned at the end of the insert internal screw threading where it will come into electrical contact with the female bushing of the laser light source when the adapter sleeve is attached to the female bushing.

A conductive cylinder is mounted on the exterior of the sleeve post having the internally threaded bore. The cylinder has a conductive adhesive applied at one end that extends over the end of the sleeve post.

An electrical device is positioned inside the sleeve post having the internal screw threading. A set screw is screw threaded into the post, and contacts the device at one end, and contacts the conductive adhesive at its opposite end. The device is thereby connected electrically between the conductive insert and the conductive cylinder on the sleeve post, thus establishing a circuit path from the insert to the sleeve post exterior through the electrical device. The electrical device is preferably a resistor. However, other electrical devices, as well as combinations of electrical devices may be employed in lieu of the resistor.

In use of the adapter assembly, the adapter sleeve is first attached to the external threading of the laser light source female bushing by screw threading the insert onto the female bushing until the end of the female bushing comes into contact with the annular stop inside the sleeve. This establishes a circuit path from the female bushing through the electrical device and the conductive sleeve post of the adapter. With the adapter attached to the female bushing of the laser light source, any optic fiber microsurgical instrument having the external post type or BNC connector of the invention may be easily connected and disconnected from the laser light source by turning the BNC connector one quarter turn relative to the adapter attached to the laser light source.

When the BNC connector of the surgical instrument is attached on the adapter, an electric circuit is established from the female bushing of the laser light source through the electrical device, the conductive sleeve post and now the collar of the BNC connector. The prior art laser light source discussed above also includes an external contact that is positioned to come into contact with the cable nut of a conventional SMA type connector when attached to the female bushing of the light source. This external contact comes into contact with the BNC connector of the assembly, and thereby a complete electrical circuit is established from the female bushing of the light source through the electrical device of the adapter and through the BNC connector and the external contact of the light source.

The electrical device, for example the resistor referred to, is specifically chosen to make the adapter compatible with the particular light source. When the electric circuit discussed above is established by connecting the adapter and BNC connector of the invention with the female bushing of the light source, the light source recognizes the particular electrical device provided in the adapter. Thus, the laser light source will operate as though an SMA connector manufactured by the same manufacturer of the light source was connected to the female bushing of the light source.

Thus, the assembly of the invention including the adapter and the BNC connector enables a quick connect and disconnect of the surgical instrument with the laser light source and also enables surgical instruments to be employed with the particular light source that were not manufactured by the particular manufacturer of the light source.

DETAILED DESCRIPTION OF THE DRAWINGS

Further objects and features of the invention will be revealed in the following detailed description of the preferred embodiment of the invention and in the drawing figures wherein:

FIG. 7 is a side partially sectioned view of the BNC connector of the invention shown in FIG. 6; and, FIG. 8 is a side view illustrating the attachment of the adapter of the invention onto the female bushing of a laser light source and the attachment of the BNC connector of the invention to the adapter.

DESCRIPTION OF THE PREFERRED EMBODIMENT

The assembly of the invention includes an adapter 36 and an external post connector, for example a BNC connector 38 for a microsurgical optic fiber instrument 40 that transmits laser light used in surgery. Alternatively, the optic fiber instrument could be employed to provide illumination to a surgical site. The adapter 36 enables the BNC connector 38 to be attached to the external screw threading of a female connector or bushing of the SMA type employed on a laser light source such as that disclosed in the earlier references U.S. Pat. No. 5,085,492. The adapter 36 also enables the microsurgical instrument 40 to be quickly and easily connected to and disconnected from the bushing without repeatedly rotating the connector to screw it on or unscrew it from the bushing as is required by prior art SMA instrument connectors. In addition, the adapter is also electrically encoded and enables use of any type of surgical instrument having a BNC type connector with a laser light source of the type that only recognizes electrically encoded surgical instruments.

Figure 1:
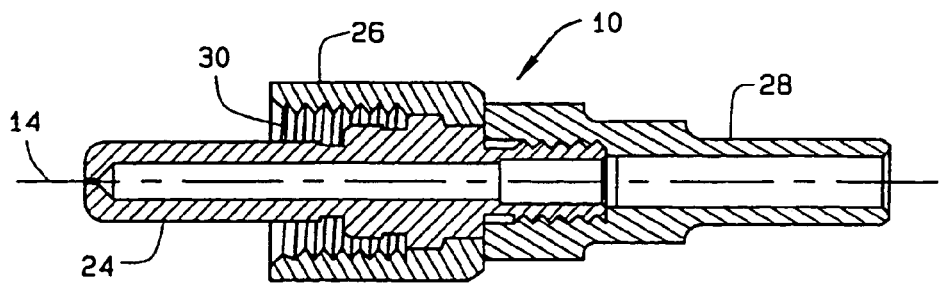
FIG. 1 is a side-sectioned view of a prior art SMA type male connector employed with optic fiber microsurgical instruments.
Figure 2:
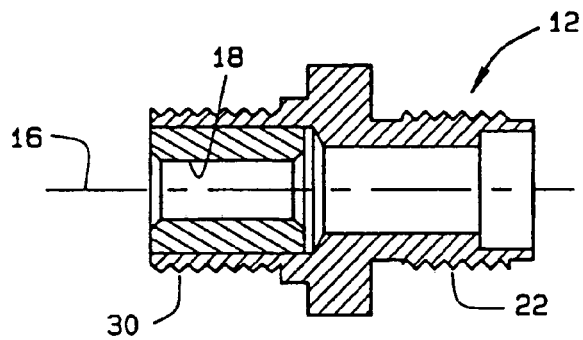
FIG. 2 is a side-sectioned view of a prior art female connector employed with the male connector of FIG. 1.
Figure 6:
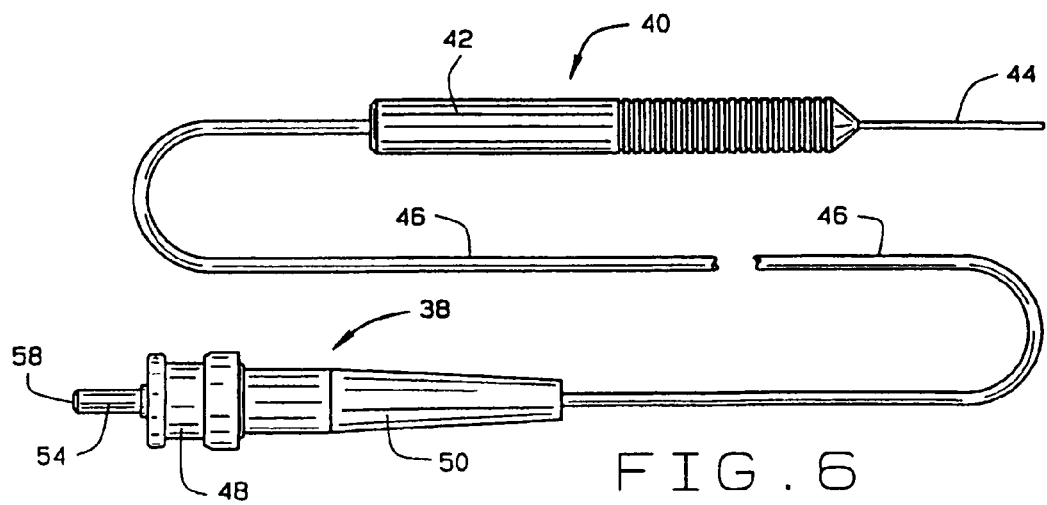
FIG. 6 is side view of a microsurgical instrument employing a BNC type connector of the invention.

The surgical instrument 40 and the BNC connector 38 of the invention are shown in FIG. 6. In this illustrative embodiment of the invention, the surgical instrument 40 is a laser probe. The construction of the surgical instrument is, for the most part, conventional and will only be described briefly. The instrument includes a handle 42 having a bore passing axially through its center. A tubular metal tip 44 or probe is secured to one end of the handle and communicates with the handle interior bore. An optic fiber 46 protected by an external layer of cladding extends into the handle bore at the opposite end of the handle from the tip 44. In the handle 42, the cladding is removed from the optic fiber and only the optic fiber extends through the tip 44 to a distal end of the fiber adjacent the distal end of the tip. The opposite end of the optic fiber extends into the BNC connector 38 of the invention.

The BNC connector 38 is basically a conventional BNC connector that is typically used as an electronic connector. Other types of external post connectors may also be used. Because the construction of the BNC connector is, for the most part, conventional, it will not be described in detail. The connector includes a cylindrical collar 48 that is mounted on a body 50 of the connector for rotation relative thereto. The collar 48 is constructed of a conductive material. The collar includes a pair of diametrically opposite grooves or slots 52. The slots 52 spiral around the collar 48 for one quarter of the circumference of the collar. A center ferrule 54 projects from the connector 38 through the center of the collar 48. The exterior of the ferrule 54 is dimensioned to fit tightly in the alignment sleeve 18 of the female connector or bushing 12 of the laser light source (not shown). The BNC connector 38 differs from prior art BNC connectors in that the optic fiber 46, with the cladding removed, extends through the center of the connector ferrule 54 with the proximal end 56 of the optic fiber being positioned adjacent the end 58 of the ferrule. Thus, with the ferrule securely inserted in the alignment sleeve 18 of the female connector 12 of the light source, the proximal end of the optic fiber 56 is accurately positioned relative to the laser light source.

Figure 5:
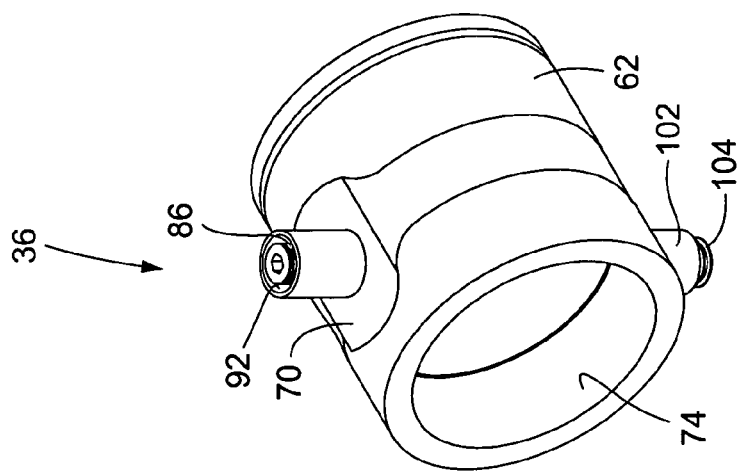
FIG. 5 is a perspective view of the adapter of the invention.
Figure 3:
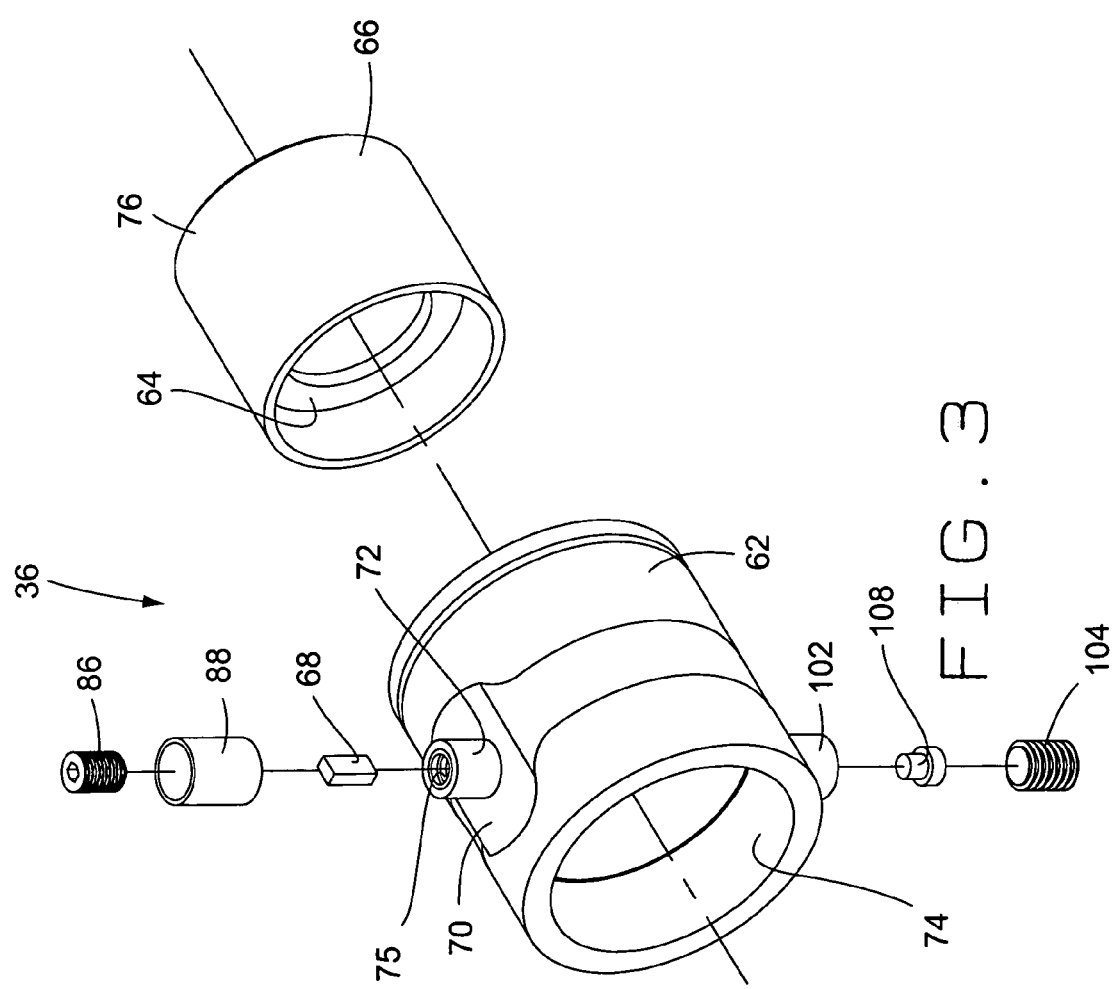
FIG. 3 is a perspective, exploded view of the adapter of the invention.
Figure 4:
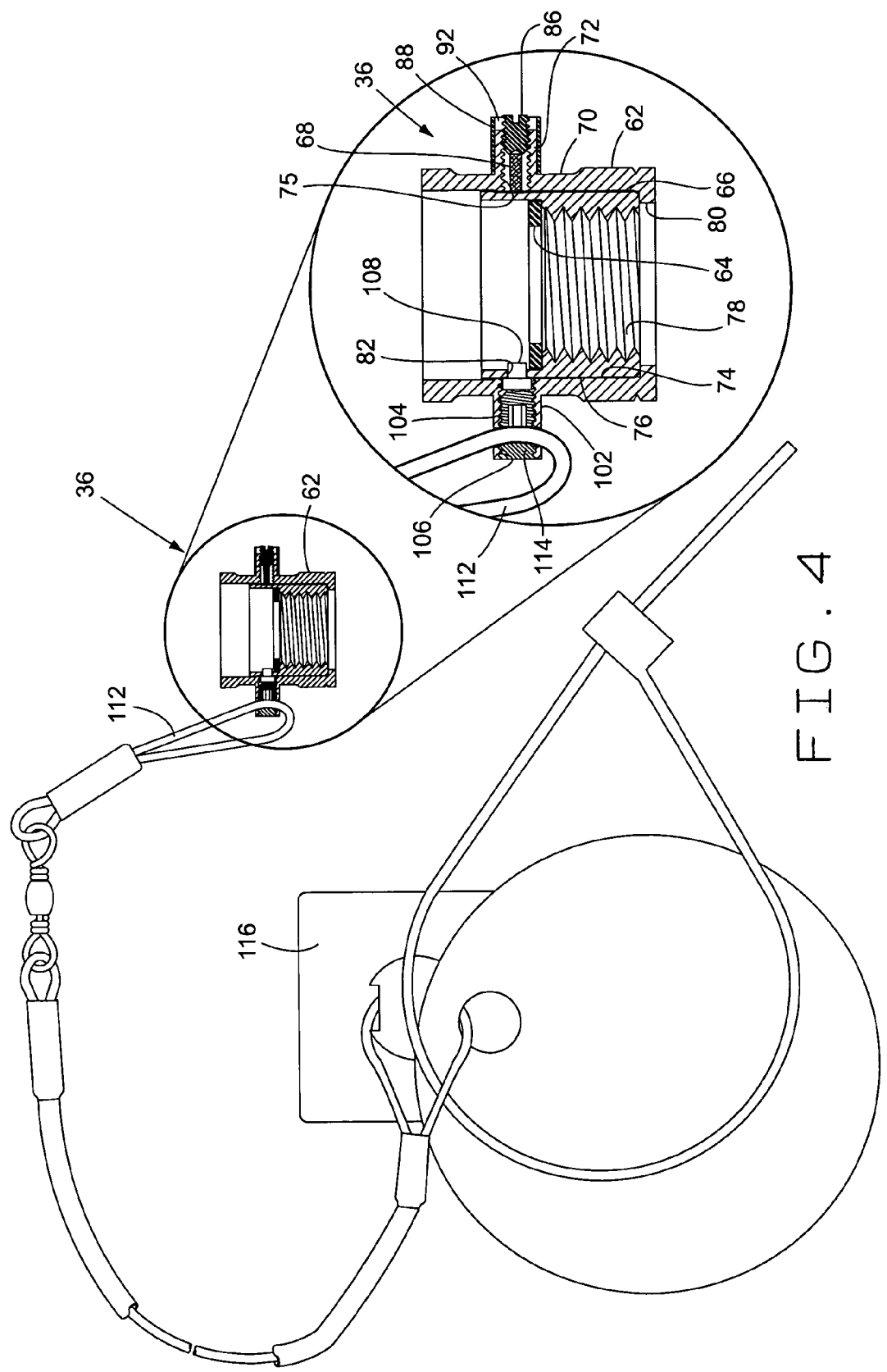
FIG. 4 is a side-sectioned view of the adapter of the invention.

The adapter 36 of the invention is shown in FIGS. 3-5. The adapter is basically comprised of a cylindrical insulating sleeve 62, an annular conductive stop 64, a conductive insert 66 and an electronic device 68, in the illustrated embodiment a resistor 68.

The adapter sleeve 62 has an external surface 70 that is dimensioned to fit inside the cylindrical collar 48 of the BNC connector 38 and engage in contact therewith. A pair of posts 72 project from the sleeve external surface 70 on diametrically opposite sides of the sleeve. The posts 72 are positioned on the sleeve to engage in the pair of slots 52 of the BNC connector collar 48 when attaching the connector to the adapter. The engagement of the posts 72 in the adapter collar slots 52 enables the BNC connector 38 to be attached on the external surface 70 of the adapter by merely rotating the BNC connector one quarter turn. Thus, the BNC connector 38 can also be disconnected from the external surface of the adapter 36 by turning the BNC connector one quarter turn in the opposite direction. The sleeve also has a cylindrical interior surface 74 surrounding an internal bore of the sleeve. Each of the sleeve posts 114 has an internally screw threading bore 118 extending completely through the post communicating the exterior of the sleeve with the sleeve interior bore.

The electrically conductive insert 66 is cylindrical and has an external surface 76 dimensioned to fit tightly into the interior surface 74 of the sleeve. The interior surface of the insert 66 is provided with internal screw threading 78 that is complementary to the external screw threading 22 of the female connector 12 of the laser light source. One end of the insert 66 engages against an annular rim 80 at the end of the adapter sleeve 62 when inserting the insert into the adapter. The opposite end of the insert has a cylindrical interior surface and a hole 82 that passes through the insert 66. The conductive insert 66 is inserted into the interior of the adapter sleeve 62 at the end of the sleeve opposite the pair of posts 72, as shown in FIG. 4. The insert is secured in place by an epoxy or by other equivalent means.

The annular stop 64 is basically a circular brass washer that is dimensioned to fit inside the interior bore of the cylindrical insert 66. The brass stop 64 is conductive and is positioned at the end of the internal screw threading 78 of the insert where it will come into electrical contact with the end of the female bushing 12 of the laser light source when the adapter 36 is screw threaded onto the bushing. The stop 64 is secured in the insert 66 against the internal screw threading 78 by brazing or by other equivalent means.

The electrical device 68, in the preferred embodiment a resistor, is secured to the adapter sleeve 62 inside one of the internally screw threaded bores 75 of the posts. Positioning the electrical device 68 inside the post of the sleeve provides protection for the device. As shown in FIG. 3 and in the detail of FIG. 4, the electronic device 68 is inserted into one of the interior bores 75 of the sleeve posts. One end of the electrical device 68 makes electrical contact with the exterior surface 76 of the conductive insert 66. A set screw 86 is screw threaded into the internally screw threaded bore 75 of the post and makes electrical contact with the opposite end of the electronic device 68. An electrically conductive cylinder 88 is mounted on the exterior surface of the post 72 containing the set screw 86. As seen in FIG. 4, the cylinder 88 extends upwardly over the post 72 and a small portion of the cylinder projects beyond the post.

A conductive adhesive 92 is applied inside the portion of the conductive cylinder 88 that projects beyond the post 72. The conductive adhesive 92 provides a conductive path between the exterior surface of the cylinder 88 and the set screw 86 contained in the post 72.

With the set screw 86 screw threaded into the post bore 84 and contacting the electrical device 68, an electrical connection is established between the conductive insert 66, the electronic device 68, the set screw 86, the conductive adhesive 92, and the conductive cylinder 88 on the post exterior. In alternate embodiments, the resistor of the electronic device 110 could be replaced with some other type of electrical device or a combination of electrical devices depending on what would be recognized by the light source the adapter is to be used with.

In the opposite post 102 from that containing the electronic device 68, a first set screw 104 is screw threaded into the internally screw threaded bore 106 of the post until it comes into contact with the insert exterior surface 76. A projection 108 is positioned in the post bore 106 adjacent the set screw 104 and engages in the sleeve hole 82 and secures the sleeve stationary inside the adapter 36. A loop 112 of a lanyard 146 is inserted through a hole in a side of the post 102 to a position inside the post internal bore 106. A second set screw 114 is screw threaded into the internally screw threaded bore 106 of the post and is tightened against the lanyard loop 112, thereby attaching the lanyard to the adapter 36. As seen in FIG. 4, the lanyard loop 112 is positioned relative to the post 102 where it will not interfere with the connection of the BNC connector with the adapter. The opposite end of the lanyard is connected to a base 116 with an adhesive backing (not shown) that enables the lanyard and the adapter to be attached to the light source with which the adapter will be used. This insures that the adapter 36, although small in size, will not become lost from the light source when not in use.

In use of the assembly illustrated in FIG. 4, the adapter sleeve 62 is first attached to the external threading 22 of the laser light source female bushing by screw threading the conductive insert 66 of the sleeve onto the female bushing. The insert 66 is screw threaded onto the bushing until the end of the female bushing comes into contact with the annular stop 64. This establishes a circuit path from the female bushing 12 through the annular stop 64, the conductive insert 66, the electrical device 68, the set screw 86, the conductive adhesive 92, and the conductive cylinder 88. With the adapter attached to the female bushing of the laser light source, any optic fiber microsurgical instrument having a BNC connector may be easily connected and disconnected from the laser light source by turning the BNC connector one quarter turn relative to the adapter attached to the laser light source.

When the BNC connector 38 of the surgical instrument is attached on the adapter 36, an electric circuit is established from the female bushing 12 of the laser light source through the annular stop 64, the conductive insert 66, the electrical device 68, the set screw 86, the conductive adhesive 92, the conductive cylinder 88, and the collar 48 of the BNC connector.

The prior art laser light source discussed above also includes an external contact 118 that is positioned to come into contact with the cable nut of a conventional SMA type connector when attached to the female bushing of the light source. This external contact 118 comes into contact with the BNC connector 38 of the assembly, and thereby a complete electrical circuit is established from the female bushing 12 of the light source through the electrical device 68 of the adapter and through the BNC connector 38 and the external contact 118 of the light source.

While the present invention has been described by reference to a specific embodiment, it should be understood that modifications and variations of the invention may be constructed without departing from the scope of the invention defined in the following claims.

What is claimed is:

1. An adapter for enabling a quick connect and disconnect between an externally threaded bushing and an external post connector, the adapter comprising:
   a cylindrical sleeve having an external surface and an internal surface, a portion of the internal surface having internal screw threading that is complementary to external screw threading of a bushing to which the sleeve is to be attached, at least one post on the external surface of the sleeve, the post being positioned to engage with a slot of a BNC connector to hold the BNC connector on the sleeve exterior surface; and
   the sleeve is an insulator constructed of an insulating material and a conductor is mounted on the sleeve post exterior.

2. The adapter of claim 1, further comprising:
   a pair of posts are positioned on opposite sides of the sleeve exterior surface to engage with slots of an external post connector to hold the connector on the sleeve exterior surface.

3. The adapter of claim 1, further comprising:
   a cylindrical sleeve insert mounted inside the sleeve with the insert having an internal surface and the internal screw threading being on the insert internal surface.

4. The adapter of claim 3, further comprising:
   the insert being conductive.

5. The adapter of claim 3, further comprising:
   an electrical device secured inside the sleeve and being electrically connected between the conductor on the sleeve post and the insert.

6. The adapter of claim 3, further comprising:
   an electrical device secured inside the sleeve post and being electrically connected between the conductor on the sleeve post and the insert.

7. The adapter of claim 1, further comprising:
   a lanyard attached to the adapter.

8. An assembly for connecting an optic fiber instrument to an externally threaded bushing of a light source, the assembly comprising:
   an external post connector having a cylindrical collar with a center axis, the collar having at least one slot therein that spirals around the center axis of the collar;
   a cylindrical insulator sleeve constructed of an insulating material and having a center axis, an external surface and an internal surface, at least one post on the sleeve positioned to engage in the slot of the connector to hold the collar of the connector on the external surface of the sleeve; and
   a conductive insert secured inside the adapter sleeve, the conductive insert having internal screw threading that is complementary to external screw threading of a bushing of a light source to which the sleeve is to be attached, the insert being positioned inside the sleeve to make electrical contact with the bushing of the light source when the adapter sleeve is threaded on the bushing of the light source.

9. The assembly of claim 8, further comprising:
   the collar slot being shaped to cause the collar to be attached on the external surface of the sleeve by the post engaging in the slot and in response to rotating the collar one quarter turn relative to the sleeve.

10. The assembly of claim 8, further comprising:
    a conductor mounted on the one sleeve post at a position where the conductor will engage with the connector collar when the post is engaged in the slot of the connector collar.

11. The assembly of claim 10, further comprising:
    an electrical device secured inside the sleeve and being electrically connected between the conductor on the sleeve post and the conductive insert.

12. The assembly of claim 10, further comprising:
    an electrical device secured inside the sleeve post and being electrically connected between the conductor on the sleeve post and the insert.

13. The assembly of claim 8, further comprising:
    the conductive insert having an interior surface and the internal screw threading being on the insert interior surface.

14. An adapter for enabling a quick connect and disconnect between an externally threaded bushing of a light source and an external post connector of an optic fiber instrument, the adapter comprising:
    a cylindrical insulator sleeve constructed of an insulating material and having an external surface and an internal surface, at least one post on the external surface of the sleeve, the post being positioned to be engage with a slot of an external post connector of an optic fiber instrument to hold the connector on the sleeve exterior surface;
    a conductive insert secured inside the sleeve, the insert having internal screw threading that is complementary to external screw threading of a light source bushing to which the sleeve is to be attached; and, an electrical device secured inside the sleeve where the electrical device will be connected in an electric circuit with the light source bushing and the BNC connector when the insert internal screw threading is mounted on the light source bushing external screw threading and the BNC connector is mounted on the sleeve exterior surface.

15. The adapter of claim 14, further comprising:

a conductor on the one sleeve post; and, the electrical device being electrically connected to the conductor on the sleeve post.

16. The adapter of claim 14, further comprising:

the electrical device being secured inside the post of the sleeve.

17. The adapter of claim 14, further comprising:

the electrical device being electrically connected to the conductive insert.

18. The adapter of claim 17, further comprising:

a conductor on the one sleeve post; and, the conductive insert being insulated from the conductor on the sleeve post by the insulator sleeve.

19. The adapter of claim 18, further comprising:

the electrical device being electrically connected between the conductive insert and the conductor on the sleeve post.

20. The adapter of claim 14, further comprising:

a lanyard attached to the adapter.

21. An assembly for connecting an optic fiber instrument to an externally threaded bushing of a light source, the assembly comprising:

a BNC connector having a cylindrical collar with a center axis, the collar having at least one slot therein that spirals around the center axis of the collar;

a cylindrical insulator sleeve constructed of an insulating material and having a center axis, an external surface and an internal surface, at least one post on the sleeve positioned to engage in the slot of the BNC connector to hold the collar of the BNC connector on the external surface of the sleeve; and an electrical device secured inside the sleeve.

22. The assembly of claim 21, further comprising:

the electrical device being secured inside the post of the sleeve.

23. The assembly of claim 21, further comprising:

a conductor on the sleeve post; and, the electrical device being electrically connected to the conductor on the sleeve post.

24. The assembly of claim 21, further comprising:

a conductive insert secured inside the sleeve and the electrical device being electrically connected to the conductive insert.

25. The assembly of claim 24, further comprising:

a conductor on the sleeve post; and, the conductive insert being insulated from the conductor on the sleeve post by the insulator sleeve.

26. The assembly of claim 25, further comprising:

internal screw threading on the conductive insert.

27. The assembly of claim 25, further comprising:

the electrical device being electrically connected between the conductive insert and the conductor on the sleeve post.

\* \* \* \* \*